United States Patent Office 3,646,155
Patented Feb. 29, 1972

3,646,155
CROSS-LINKING OF A POLYOLEFIN WITH A SILANE
Henry George Scott, Glamorgan, Wales, assignor to Midland Silicones Limited, Reading, Berkshire, England
No Drawing. Filed Dec. 18, 1969, Ser. No. 886,346
Claims priority, application Great Britain, Dec. 20, 1968, 60,650/68
Int. Cl. C08f 29/12; C08g 47/10
U.S. Cl. 260—827         9 Claims

ABSTRACT OF THE DISCLOSURE

Polyolefins are cross-linked by reaction of the polyolefin with an unsaturated hydrolysable silane at a temperature above 140° C. and in the presence of a compound capable of generating free radical sites in the polyolefin, and subsequent exposure of this product to moisture and a condensation catalyst.

---

This invention relates to a process for effecting the cross-linking of olefinic polymers and copolymers and to the cross-linked products obtained thereby.

It is known to modify the properties of polyethylene and other olefinic polymers by effecting cross-linking of the polymers under the action of a free radical generator, for example an organic peroxide. The formation of a cross-linkable material by this means is however difficult to carry out since it requires critical control of the process. If the process is carried too far the polyolefin may cross-link and solidify in the processing apparatus, for example an extruder, with the consequent difficulties and delays involved in removing the cross-linked product. Care must also be exercised to ensure that articles prepared from the polymer retain their shape during subsequent heating to bring about the cross-linking process.

We have now discovered that an improved method for effecting the cross-linking of a polyolefin resides in a process involving the reaction of a silane with the polyolefin under specified conditions and the subsequent reaction of the modified polyolefin with a silanol condensation catalyst and water. It is known from U.S. Pat. No. 3,075,948 to prepare graft copolymers of polyolefins and silanes by reacting a polyolefin with an unsaturated silane, an addition catalyst preferably being employed in the reaction. According to the disclosure in the U.S. specification the presence of a solvent during the grafting reaction is greatly preferred since it produces a greater degree of reaction. As disclosed however, the grafting process requires the use of a high proportion of the relatively expensive silane reactant and extended reaction times, even in the presence of a solvent.

The process of the present invention enables the cross-linking of a polyolefin to be carried out under less critical processing conditions than those which normally obtain in connection with the conventional peroxide cross-linking techniques. It also permits the cross-linking reaction to take place in two stages so that the polyolefin may be stored in cross-linkable form, if desired, prior to effecting subsequent cross-linking. The present process also enables the reaction between the polyolefin and the silane to be effected relatively quickly, if desired in the absence of a solvent, and employing only minor amounts of silane.

The process of the invention therefore lends itself to the preparation of a cross-linked polyolefin whereby the conversion of the polyolefin to the cross-linkable form may be carried out in equipment conventional in the processing of polyolefins and under conditions and in a time comparable with those normally employed during the compounding of such materials.

Accordingly this invention procides a process for effecting the cross-linking of a polyolefin, which comprises (A) reacting a polyolefin, which is polyethylene or a copolymer of ethylene with a minor proportion of propylene and/or butylene, with a silane of the general formula RR'SiY$_2$ (wherein R represents a monovalent olefinically unsaturated hydrocarbon or hydrocarbonoxy radical, each Y represents a hydrolysable organic radical and R' represents an R radical or a Y radical) in the presence of a compound capable of generating free radical sites in the polyolefin, the said reaction being carried out at a temperature above 140° C. and the said free radical generating compound having a half-life at the reaction temperature of less than 6 minutes; and (B) subsequently exposing the product of (A) to moisture in the presence of a silanol condensation catalyst.

The invention also includes cross-linked polyolefins and shaped articles therefrom whenever prepared by the said process. The process of this invention is applicable in effecting the cross-linking of polyethylene or copolymers of ethylene with minor amounts (less than 50 percent by weight) of propylene and/or butylene. Preferably the polyolefin employed should have a melt index, as measured according to method 105C of British standard specification No. 2782 (1965), before reaction with the silane of at least 2.0 g./10 min.

In the general formula RR'SiY$_2$ of the silanes which are reacted with polyolefins according to this invention, R may be a monovalent aliphatically unsaturated hydrocarbon radical or hydrocarbonoxy radical which is reactive with the free radical sites generated in the polyolefin. Examples of such radicals are vinyl, allyl, butenyl, cyclohexenyl, cyclopentadienyl, cyclohexadienyl, $$CH_2=C(CH_3)COO(CH_2)_3—,$$

$$CH_2=C(CH_3)COOCH_2CH_2O(CH_2)_3— \text{ and}$$

$$CH_2=C(CH_3)COOCH_2CH_2OCH_2\overset{OH}{\underset{|}{C}}HCH_2O(CH_2)_3—$$

The vinyl radical being preferred. The group Y may represent any hydrolysable organic radical for example an alkoxy radical such as the methoxy, ethoxy and butoxy radicals, an acyloxy radical, for example the formyloxy, acetoxy or propionoxy radicals, oximo radicals e.g.

$$—ON=C(CH_3)_2$$

—ON=CCH$_2$C$_2$H$_5$ and —ON=C(C$_6$H$_5$)$_2$ or substituted amino radicals e.g. alkylamino and arylamino radicals examples of which are —NHCH$_3$, —NHC$_2$H$_5$ and —NH(C$_6$H$_5$)$_2$. The group R' may represent an R group or a Y group. Preferably the silane will contain three hydrolysable organic radicals the most preferred silanes being vinyltriethoxysilane and vinyl trimethoxysilane.

The proportion of silane employed will depend in part upon the reaction conditions and in part on the degree of modification desired in the polyolefin. The actual proportion may vary widely for example from 0.1 to 50 percent by weight based on the weight of polyolefin. In general however we prefer to employ from 0.5 to 10 percent by weight based on the weight of polyolefin.

As the free radical generating compound there may be employed any compound which is capable of producing free radical sites in the polyolefin under the reaction conditions and which has a half life at the reaction temperature of less than 6 minutes and preferably less than 1 minute. The best known and preferred free radical generating compounds for use in this invention are the organic peroxides and peresters for example benzoyl peroxide, dichlorobenzoyl peroxide, dicumyl peroxide, di-tertiary butyl peroxide, 2,5 dimethyl -2,5 di(peroxy benzoate) hexyne -3; 1,3-bis(t-butyl peroxy isopropyl) benzene, lauroyl peroxide, tertiary butyl peracetate, 2,5-dimethyl-2,5 di(t-butylperoxy) hexyne-3; 2,5 dimethyl-2,5-di(t-butylperoxy) hexane and tertiarybutyl perbenzoate, and azo compounds, for example azobis-isobutyronitrile and dimethylazodi isobutyrate, dicumyl peroxide being the most preferred.

The particular free radical generating compound chosen in any instance will depend upon the temperature at which reaction of the polyolefin with the silane is to be performed. Thus, for example when the reaction is to be performed at about 190–200° C. dicumyl peroxide, which has a half life of about 15 seconds at this temperature will be suitable. If the reaction of the mixture is to be performed at say, 150° C. a peroxide, e.g. benzoyl peroxide which has an appropriate half life at this temperature should be used. The proportion of free radical generating compound employed will vary somewhat with the nature of the polyolefin and the degree of modification desired in the polyolefin. While sufficient of the free radical generator should be used to obtain the desired degree of modification the proportion should not be such as to cause conventional free-radical cross-linking of the polyolefin to become the predominant mechanism. For this reason we prefer to employ not more than about 0.75 percent by weight of the free radical generator based on the weight of the polyolefin. As little as 0.01 percent of the free radical generator may be used and will give rise to some cross-linking capability in the polyolefin but for most applications we prefer to use from 0.05 to 0.2 percent by weight based on the weight of the polyolefin.

In accordance with step (A) of the process of this invention reaction between the polyolefin and the silane is carried out at a temperature above 140° C. The reaction may be carried forward employing any suitable apparatus. Preferably however, the reaction is carried forward under conditions in which the polyolefin is subjected to mechanical working. The reaction is therefore preferably carried out in, for example, an extruder, an internal Banbury mixer or a roll mill provided it permits the polyolefin to reach the desired temperature. The most preferred form of apparatus for use in forming the cross-linkable polyolefin is of the type which comprises an extruder adapted to effect a kneading or compounding action on its contents. One such type of apparatus is that known as the Ko-Kneader which is adapted to accomplish mechanical working and compounding of polyolefins at elevated temperatures. Such apparatus also generally includes a vacuum port whereby any unreacted silane may be removed.

The polyolefin and silane reactants may be brought together by any convenient means. For example the liquid silane may be introduced into the apparatus in which the reaction is to take place dispersed on the surface of the polyolefin or it may be metered directly into the apparatus. The free radical generating compound may be also introduced by way of the surface of the polyolefin or may be added, when possible, as a solution in the silane.

Reaction between the silane and polyolefin may be carried forward at any temperature between 140° C. and the degradation temperature of the polyolefin. The actual reaction temperature employed will normally be determined by considerations of the type of apparatus in which the reaction is performed and where appropriate on the power input for the apparatus. When the polyolefin is polyethylene we prefer to perform the reaction at temperatures similar to those usually met with during the processing of polyethylene, that is from about 160 to 220° C. for periods up to 10 minutes.

Although minor amounts of organic solvents may be employed if desired to facilitate the addition of the free radical generator or the silane the reaction is usually best carried out in bulk since this avoids subsequent tedious solvent separation procedures.

Cross-linking of the silane modified polyolefin according to step (B) of the process of this invention is effected by exposing the product of step (A), usually after shaping by extrusion or other processes, to moisture in the presence of a silanol condensation catalyst. The moisture present in the atmosphere is usually sufficient to permit the cross-linking to occur but the rate of cross-linking may be hastened if desired by the use of an artificially moistened atmosphere immersion in liquid water and optionally employing elevated temperatures. Preferably cross-linking is effected at a temperature above 50° C. and most preferably by exposing the product of step (A) to steam at 100° C. or higher.

Provided the reaction product of the polyolefin and the silane is kept free of moisture and/or of material which acts as a silanol condensation catalyst it may be stored in substantially unchanged form for a considerable period of time. As it is often difficult to exclude all traces of moisture from the polyolefin the preparation of a product which remains substantially unchanged over a long storage period is usually only possible when the hydrolysable moieties in the silane are those, such as alkoxy radicals, which give rise to non-catalytic by-products. When the silane contains for example silicon-bonded acetoxy radicals or even trace quantities of silicon-bonded chlorine atoms the acetic acid or hydrochloric acid by products can cause some cross-linking to occur at normal ambient temperatures if moisture has not been excluded from the composition.

Where it is possible to maintain the polyolefin composition in an anhydrous condition the incorporation of a silanol condensation catalyst by mixing in prior to storage can give rise to a product of satisfactory stability. Similarly if a storage stable product is not desired the use of a silane or other additive which generates a silanol condensation catalyst in situ during hydrolysis may be permissible, or even preferred. In general however, we prefer to incorpoate the silanol condensation catalyst into the product of step (A) only when it is desired to initiate cross-linking of the polyolefin, for example, just prior to shaping the polyolefin into the finished article. According to a preferred method of carrying out this invention the cross-linkable polyolefin composition is provided in the form of two separate components, one component comprising the polyolefin which has been modified according to step (A) of the process of this invention, the other component comprising a composition obtained by mixing the silanol condensation catalyst with a polyolefin which has not been modified by reaction with the silane. The two components may then be blended in the desired proportions to provide a composition which is cross-linkable in the presence of water. In order to obtain a polyolefin having the maximum degree of cross-linking capability the unmodified polyolefin preferably comprises not more than about 10 percent by weight of the total quantity of polyolefin in the mixed composition. When preparing a cross-linkable polyolefin by this technique therefore we prefer to employ from about 1 to 10 percent by weight of the unmodified polyolefin catalyst component based on the total polyolefin content of the composition. Preferably also the polyolefin used in the catalyst component has a melt index the same as, or approximating to that of the silane-modified polyolefin with which it is to be mixed.

A wide variety of materials which function as silanol condensation catalysts are known in the art and any of such materials may be employed in the process of this invention. Such materials include for example metal carboxylates such as dibutyltin dilaurate, stannous acetate, stannous octoate, lead naphthenate, zinc octoate, iron-2-ethylhexoate and cobalt naphthenate, organic metal compounds such as the titanium esters and chelates, for example tetrabutyl titanate, tetranonyl titanate and bis-(acetylacetonyl) di-isopropyl titanate, organic bases such as ethylamine, hexylamine, dibutylamine and piperidine and acids such as the mineral acids and fatty acids. The preferred catalysts are the organic tin compounds for example, dibutyltin dilaurate, dibutyltin diacetate, and dibutyltin dioctoate.

Having regard to the considerations discussed previously herein the silanol condensation catalyst may be incorporated prior to, during or following the reaction of the polyolefin and the silane. The catalyst may be added as such or generated in situ either by hydrolysis of the silane or for example by the thermal decomposition of a material which liberates an amine or other silanol condensation catalyst as a decomposition product. In addition to the presence of the silanol condensation catalyst or precursor thereof the polyolefin may contain, if desired, other ingredients, for example fillers and pigments.

Cross-linked polyolefins produced according to this invention are characterised by physical properties which are comparable to those obtained by conventional methods i.e. by organic peroxide cross-linking. For example cross-linked polyethylene has been prepared having an extremely high resistance to stress cracking, resistance to organic solvents and a measurable tensile strength above its crystalline melting point. The process may therefore be advantageously employed on any application where a degree of cross-linking of the polyolefin is desired, for example in the preparation of electrical insulation and heat resistant moulded or extruded articles such as containers and conduits for hot liquids.

The following examples illustrate the invention.

EXAMPLE 1

100 parts by weight of an injection moulding grade high density polyethylene granules (grade 65–045 MB) having a melt index of 3.8 g./10 min. and nominal density of 0.965 g./cc. were coated by tumbling with 3 parts weight of vinyltriethoxysilane having dissolved in it 0.12 part of dicumyl peroxide, until all of the liquid had been taken up. The composition was then extruded using a PR 46 Buss Ko-Kneader from which the second barrel had been removed, and the following conditions, Temperature of screw—182° C.
Temperature of barrel zone 1—180° C.
Temperature of barrel zone 2—184° C.
Screw speed—31 r.p.m.
Output—13 lbs. per hour The residence time of the polyethylene in the machine was approximately 1.5 to 2.5 minutes.

The extruded product was collected as rough lumps and then granulated. It was found to have a melt index of 0.93 g./10 min. Extraction of the product in refluxing dry toluene and analysis of the cold extract by vapour phase chromatography indicated that 88.5% by weight of the vinyltriethoxysilane had been reacted with the polyethylene.

A second composition (D) was then prepared similarly employing 100 parts of the polyethylene (grade 65–045 MB), 1 part of dibutyltin dilaurate and 0.12 part of dicumyl peroxide. Extrusion and granulation yielded a product having a melt index of 0.83 g./10 minutes.

95 parts by weight of (C) and 5 parts by weight of (D) were mixed by dry tumbling for 20 minutes to give a cross-linkable composition. This composition was extruded using the Buss Ko-Kneader employing the conditions set out above. The product had a melt index of 0.57 g./10 min. and contained no insoluble gel. In order to test the criticality of the processing conditions the extruder was stopped (full of polymer) for 30 minutes. When the extruder was restarted an extrudate was immediately obtained having a melt index of 0.37 g./10 min. and containing no insoluble gel.

The cross-linkable composition obtained by mixing (C) and (D) in the above specified proportions was moulded into sheets of thickness 0.125 and 0.060 inch which were then cross-linked by exposure to steam at 100° C. for 48 hours. After this time the proportion of insoluble gel (measured by refluxing in xylene for 20 hours) was 68%.

Samples of the cross-linked sheets were tested for environmental stress cracking resistance according to ASTM D1693–59T (in Igepal at 50° C.). No failures were found after 5000 hours whereas an uncross-linked polyethylene (melt index 0.90 g./10 min. and density 0.960 g./cc.) failed after 24 hours.

When tested for tensile strength above its crystalline melting point (at 160° C.) under a strain rate of 5 in./min. the following results were obtained for the cross-linked material.

Tensile stress at 100% elongation=440 p.s.i.
Tensile stress at break point=590 p.s.i.
Elongation at break point=210%

The cross-linkable composition was satisfactorily blow moulded to produce 30 g. weight bottles of 10 fl. oz. capacity.

EXAMPLE 2

100 parts by weight of high density polyethylene granules (58045 MB) having a nominal melt index of 4.5 g./10 min. and density of 0.958 g./cc. were coated by tumbling with 2 parts by weight of vinyltriethoxysilane and 0.10 part by weight of dicumyl peroxide.

This composition was then extruded on a PR 46 Buss Ko-Kneader with the cross head extruder removed and using the following conditions:

Temperature of screw—185° C.
Temperature of barrel zone 1—182° C.
Temperature of barrel zone 2—189° C.
Output—6.9 lb./hr.

The extrudate had a melt index of 1.0 g./10 min. and analysis showed that 91.5% by weight of the vinyltriethoxysilane had reacted. The processed polymer was converted to the cross linked state when mixed with 0.2% by weight of dibutyltin dilaurate, moulded into a sheet 0.07 inch thick and the sheet exposed to steam at 100° C. for 48 hours.

EXAMPLE 3

A cross-linkable polyethylene composition was prepared employing the processing procedure of Example 2 in connection with 100 parts by weight of polyethylene (50120 MB), 3 parts of vinyltriethoxysilane and 0.17 part of dicumyl peroxide. The processing conditions in the Buss Ko-Kneader were:

Screw—Neutral
Temperature of barrel zone 1—185° C.
Temperature of barrel zone 2—186° C.
Temperature of barrel zone die—190° C.
Output—10.5 lb./hr.

The extrudate was cut into pieces on emergence from the Kneader and the pieces cooled by momentary (about 2 sec.) immersion in water.

The recovered extrudate contained no gel and had a melt index of 1.3. When mixed with 0.2% by weight of dibutyltin dilaurate and exposed as 1/16 inch thick plates to steam at 100° C. for 48 hours a product was obtained having a gel content at 65.6%.

EXAMPLE 4

A cross-linkable polyethylene composition was prepared using procedure of Example 2 with a low density polyethylene (25200 MA) 2 parts of vinyltrimethoxysilane, 0.15 part of dicumyl peroxide and the following conditions in the Ko-Kneader:

```
                                                    ° C.
Temperature of barrel zone 1 _____ 182
Temperature of barrel zone 2 _____ 184
Temperature of cross [1] head extruder _____ 185
```

[1] Not fitted in Example 2.

Two catalyst master batches (A) and (B) were also prepared by mixing and extruding 100 parts of polyethylene 25200 MA, 0.15 part dicumyl peroxide and 2.5 parts of dibutyltin dilaurate in the one case and 100 parts 25200 MA, 0.15 part dicumyl peroxide and 2.5 dibutyltin diacetate in the other. Two compositions were then prepared by mixing 98 parts of the silane modified polymer with 2 parts of the catalyst compositions (A) in the case and composition (B) in the other. Both compositions cross-linked on exposure to steam at 100° C. for 24 hours.

EXAMPLE 5

When the procedure of Example 4 was repeated employing vinylmethyldimethoxysilane in place of vinyltrimethoxysilane, similar results were obtained.

That which is claimed is:

1. A process for effecting the cross-linking of a polyolefin, which comprises: (A) reacting a polyolefin which is polyethylene or a copolymer of ethylene with a minor proportion of propylene or butylene or a mixture thereof, with a silane of the general formula $RR'SiY_2$, wherein R represents a monovalent olefinically unsaturated hydrocarbon or olefinically unsaturated nonhydrolyzable hydrocarbonoxy radical, each Y represents a hydrolysable organic radical and R' represents an R radical or a Y radical, in the presence of a compound capable of generating free radical sites in the polyolefin, said reaction being carried out at a temperature above 140° C. and the free radical generating compound having a half-life at the reaction temperature of less than 6 minutes; and (B) subsequently exposing the product of (A) to moisture in the presence of a silanol condensation catalyst.

2. A process as claimed in claim 1 wherein the polyolefin has a melt index of at least 2.0 as measured according to Method 105C of British standard specification No. 2782 (1965).

3. A process as claimed in claim 1 in which step (B) is effected by the action of steam.

4. A process as claimed in claim 1 wherein step (A) is carried out at a temperature within the range from 160° to 220° C.

5. A process as claimed in claim 1 wherein step (A) is carried out under conditions in which the polyolefin is subjected to mechanical working.

6. A process as claimed in claim 5 wherein step (A) is carried out in an extruder adapted to effect a kneading or compounding action on its contents.

7. A process for effecting the cross-linking of a polyolefin which comprises: (1) reacting a polyolefin which is polyethylene or a copolymer of ethylene with a minor proportion of propylene or butylene or a mixture thereof with a silane of the general formula $RR'SiY_2$, wherein R represents a monovalent olefinically unsaturated hydrocarbon or olefinically unsaturated nonhydrolyzable hydrocarbonoxy radical, each Y represents a hydrolysable organic radical and R' represents an R radical or a Y radical, in the presence of a compound capable of generating free radical sites in the polyolefin, said reaction being carried out at a temperature above 140° C. and the free radical generating compound having a half-life at the reaction temperature of less than 6 minutes; (2) blending the product of step (1) with a silanol condensation catalyst; (3) shaping the product of steps (2) and (4) exposing the shaped product to moisture.

8. A process as claimed in claim 7 wherein the polyolefin has a melt index of at least 2.0 as measured according to Method 105C of British standard specification No. 2782 (1965).

9. A process as claimed in claim 7 wherein the silanol condensation catalyst is incorporated into the product of step (1) as a mixture with a polyolefin which has not been modified by reaction with the silane.

References Cited

UNITED STATES PATENTS 3,075,948  1/1963  Santelli _____ 260—827
3,471,440  10/1969  Ashby _____ 260—827

SAMUEL H. BLECH, Primary Examiner

U.S. Cl. X.R.

260—23 H